(12) United States Patent
Nicolai et al.

(10) Patent No.: US 7,680,269 B2
(45) Date of Patent: Mar. 16, 2010

(54) METHOD FOR CIPHERING A COMPRESSED AUDIO OR VIDEO STREAM WITH ERROR TOLERANCE

(75) Inventors: Jean Nicolai, Chateauneuf le Rouge (FR); William Orlando, Peynier (FR)

(73) Assignee: STMicroelectronics S.A., Montrouge (FR)

( * ) Notice: Subject to any disclaimer, the term of this patent is extended or adjusted under 35 U.S.C. 154(b) by 1099 days.

(21) Appl. No.: 11/331,585

(22) Filed: Jan. 13, 2006

(65) Prior Publication Data

US 2006/0182274 A1 Aug. 17, 2006

Related U.S. Application Data

(63) Continuation of application No. PCT/FR2004/001794, filed on Jul. 8, 2004.

(30) Foreign Application Priority Data

Jul. 16, 2003 (FR) ................... 03 08641

(51) Int. Cl.
*H04L 9/00* (2006.01)
*H04K 1/04* (2006.01)
*H04L 9/32* (2006.01)

(52) U.S. Cl. .............. 380/28; 380/37; 380/42; 713/181; 713/189

(58) Field of Classification Search ......... 380/200–201, 380/210, 212, 217, 268–269, 37, 42, 46, 380/29; 713/160, 189
See application file for complete search history.

(56) References Cited

U.S. PATENT DOCUMENTS

| | | | | |
|---|---|---|---|---|
| 5,541,995 A | * | 7/1996 | Normile et al. | ............ 380/42 |
| 6,505,299 B1 | | 1/2003 | Zeng et al. | |
| 6,914,637 B1 | * | 7/2005 | Wolf et al. | ............ 348/473 |
| 7,062,048 B2 | * | 6/2006 | Livaditis et al. | ............ 380/241 |
| 2002/0018565 A1 | | 2/2002 | Luttrell et al. | |

FOREIGN PATENT DOCUMENTS

EP 0 582 122 A1 2/1994

OTHER PUBLICATIONS

Shi, C., et al., "An Efficient MPEG Video Encryption Algorithm," in *Proceedings of the 17th IEEE Symposium on Reliable Distributed Systems*, West Lafayette, IN, Oct. 20-23, 1998, pp. 381-386.
Li et al. (Eds.), MPEG-4 Video Verification Model version 18.0, International Organisation for Standardisation, Jan. 2001.

* cited by examiner

*Primary Examiner*—Hosuk Song
(74) *Attorney, Agent, or Firm*—Lisa K. Jorgenson; Timothy L. Boller; Seed IP Law Group PLLC (57) ABSTRACT

A method ciphers a standardized stream of compressed audio or video data, wherein at least one part of the bits of data packets delimited by two consecutive synchronization markers is ciphered by pseudo-random stream.

25 Claims, 4 Drawing Sheets

FIG. 1A  FIG. 1B

Table B-23
("RVLC table for TCOEF")

| INDEX | intra | | | inter | | | BITS | VLC_CODE |
|---|---|---|---|---|---|---|---|---|
| | LAST | RUN | LEVEL | LAST | RUN | LEVEL | | |
| 0 | 0 | 0 | 1 | 0 | 0 | 1 | 4 | 110s |
| 1 | 0 | 0 | 2 | 0 | 1 | 1 | 4 | 111s |
| 2 | 0 | 1 | 1 | 0 | 0 | 2 | 5 | 0001s |
| 3 | 0 | 0 | 3 | 0 | 2 | 1 | 5 | 1010s |
| 4 | 1 | 0 | 1 | 1 | 0 | 1 | 5 | 1011s |
| 5 | 0 | 2 | 1 | 0 | 0 | 3 | 6 | 00100s |
| 6 | 0 | 3 | 1 | 0 | 3 | 1 | 6 | 00101s |
| 7 | 0 | 1 | 2 | 0 | 4 | 1 | 6 | 01000s |
| 8 | 0 | 0 | 4 | 0 | 5 | 1 | 6 | 01001s |
| 9 | 1 | 1 | 1 | 1 | 1 | 1 | 6 | 10010s |
| 10 | 1 | 2 | 1 | 1 | 2 | 1 | 6 | 10011s |

METHOD FOR CIPHERING A COMPRESSED AUDIO OR VIDEO STREAM WITH ERROR TOLERANCE

CROSS REFERENCE TO RELATED APPLICATIONS

The present application is a continuation of and claims priority under 35 U.S.C. §120 from International Application Serial No. PCT/FR2004/001794, filed on Jul. 8, 2004 and designating the United States, which claims priority from French Application Serial No. 03/08641, filed on Jul. 16, 2003, both of which are assigned to the same assignee as the present application and incorporated herein by reference in their entireties.

BACKGROUND OF THE INVENTION

1. Field of the Invention

The present invention relates to a method for processing compressed data, and to apparatus and media for its implementation.

The technical field of the present invention is the manufacturing of audio and/or video data encoders.

2. Description of the Related Art

The present invention relates more particularly to a method for selectively (partially) ciphering audio or video data by a cipher algorithm, the data being compressed and organized according to a standardized format, and being capable of comprising codewords of variable length.

Today, the secured distribution of video documents is limited to the broadcasting of "pay-as-you-go" cable or satellite television; the security is provided by "proprietary" cipher systems, which are defined, implemented and controlled by a single provider: the broadcaster.

The new standards of low-rate video, broadband Internet and wireless-network handheld terminals, of 3G telephone or personal assistant type, should soon enable the distribution of video documents: teleconferencing, multimedia messages, film trailers, live sporting events and video on demand, in particular.

Some security requirements are emerging which cannot be met by the current solutions. The requirements are as follows:

a—the syntax of the ciphered stream must remain as compliant as possible with the coding standard, in order to facilitate the transport by network; the method for processing data must provide transparency to the transcoding and to the changes in data rates, as well as transparency to the routers and servers for reasons of confidence; the method must enable random access and other video processing without deciphering the complete stream, and must enable the transport by protocols provided for standard video;

b—the compression efficiency must not be reduced as a result of the securement of the data by cipher;

c—the securement must be compatible with various tools provided for by the video data compression standards (MPEG4, H264), particularly the resistance to errors, for wireless transmission and the losses of IP (Internet Protocol) packets, as well as the multi-level coding, for heterogeneous bandwidth client terminals;

d—the security and backward masking level must be adapted to the application: robustness to video-specific attacks;

e—the required computing power must remain compatible with embedded terminals, for applications like the wireless streaming of multimedia documents for example.

According to the MPEG standard, a video sequence is made up of a series of groups of images, each image group comprising a series of images of type I (intrinsic), P (predicted) and B (bi-directional); each type-I image is split into macroblocks; each macroblock is converted into four luminance blocks and into two chrominance blocks, this conversion resulting in a first loss of information.

Each 64-pixel block is converted into a 64-coefficient table by a DCT ("discrete cosine transform"); this table is compressed by quantization and then ordered and coded ("zig-zag ordering" and "run-length coding") according to the number of zero-value coefficients encountered during a zig-zag scan of the table; the resulting compressed data are coded into words of variable length ("Huffman coding"); these transformations also result in a loss of information.

Various methods for ciphering a standardized video data stream—particularly an MPEG-standard stream—have been proposed in order to meet some of the aforementioned requirements.

When a codeword that is part of a table of codewords of different lengths is entirely ciphered, the result is generally a codeword which does not belong to this table ("non-compliant" word); consequently, a decoder that analyses the codewords bit by bit and makes decisions at each bit, will not be able to recognize the boundary of the ciphered codeword, will "get confused" and will no longer know which data field it is analyzing; this disadvantage results from the fact that the codewords are of variable length.

The document "A Fast Mpeg Video Encryption Algorithm", Changgui Shi et al., ACM Multimedia 98, describes a method for ciphering MPEG-compressed video data, by a secret key; the sign bits of the Huffman coefficients (AC and DC)—which are codewords of variable length—are "XORed" bit by bit with a key of determined length (i.e. combined bit by bit with the bits of the key by means of XOR logic gates, i.e. "exclusive OR" gates), and are respectively replaced—in the video data stream—with the bit value resulting from this operation; this document proposes using one or several long key(s); a 128-bit key is used as an example.

According to this document, only the sign bits of the codewords are ciphered, and only for the codewords that represent useful data (motion vectors and DCT coefficients representing the texture), which results in a compliant codeword. If the codewords representing something else were ciphered, like the number of coded blocks for example, even if compliant codewords were obtained after ciphering, the decoder would be lost.

This selective cipher method, which operates on a small part of the data stream, requires fewer computing resources than those required by the methods for fully ciphering the stream; on the other hand, the darkening of the ciphered images is relatively low.

According to the aforementioned Changgui Shi et al. document, sync points, which are added to the data stream, enable a decoder that has the key to know which position in the ciphered stream it must start using the deciphering key from again; these sync points are added at the start of each image group, at the start of each type-I image or at the start of a predetermined number of images.

Schedule E to the ISO standard 14496-2 defines several useful tools or modes to minimize the negative consequences of errors in the transmission of a compressed data stream: i) the synchronization markers; ii) the separation between the texture data on the one hand, the header and motion data on the other hand; iii) the use of reversible codes of variable length for the coding of the texture data.

In a "video packet synchronization" mode, a periodic synchronization marker can be created at the end of a macroblock when the number of bits since the previous marker is higher than a certain threshold; a video packet (part of the stream between two successive markers) therefore has a variable number of macroblocks.

When the data stream is partially ciphered with a block cipher algorithm, like the DES (64-bit block) and a fortiori the AES (128 bits) standards for example, the number of data bits to be ciphered inside this video packet can be lower than the number of bits of the cipher block, in particular when the packet contains the motion vectors associated With the P and B-type images; in this case, this packet will be transmitted without ciphering, and the darkening of the sequence will be reduced.

The U.S. Pat. No. 6,505,299-B1 (Zeng et al.) describes different methods for ciphering quantized (partially compressed) video data before their coding by Huffman tables, by RLE encoding, arithmetic coding or other entropy coding: a spatial frequency transform is applied to the image, which generates a map of transform coefficients; these coefficients are then ciphered, either by scrambling their sign bits, by scrambling their least significant bits, by mixing blocks of the map, or by mixing coefficients corresponding to a spatial frequency band of the map.

This document further proposes ciphering the motion vectors of the P and B-type images; this increases the darkening of the ciphered images.

A disadvantage of these cipher methods is that they reduce the efficiency of the data compression obtained by quantization; another disadvantage is that they require computing means that are more significant than those required for a cipher after Huffman coding or equivalent.

The patent application US-2002/0018565 (Luttrell et al.) describes a method for selectively ciphering an MPEG4 data stream that preserves the coding syntax; according to this method, the indexes (of fixed length equal to n) of a table of $2^n$ words of variable length are ciphered, and for each index of the table, the word (in plain text) corresponding to this index is replaced with the word (in plain text) corresponding to the ciphered index; this method does not enable the relation of the table in plain text between the length of a codeword and the frequency of occurrence of the corresponding symbol in a data stream to be kept; consequently, it reduces the data compression by coding using the ciphered table.

Some of the known methods for ciphering a video data stream are insensitive to the loss of a data packet; on the other hand, these methods are sensitive to the isolated loss of one or more data bits, which frequently occurs in wireless transmission systems in particular.

Furthermore, these known methods are not compatible with the methods for adapting the stream to a variable bandwidth provided by the MPEG4FGS standard ("fine granularity scalability", MPEG-4 Video Verification Model version 18.0, January 2001), in which, to adapt a data stream to a reduced-bandwidth transmission channel, the data stream is truncated at arbitrary positions, as soon as the number of bits allocated to the channel has been reached, in the middle of an image for example.

BRIEF SUMMARY OF THE INVENTION

An embodiment of the present invention proposes an improved method for ciphering a standardized stream of compressed data.

The method—at least in part—overcomes the disadvantages of the known methods for ciphering compressed audio and video data streams.

In the present application, the terms and expressions "coded word", "code word" and "codeword" are used indifferently to designate a word of a table of words of different lengths.

According to a first embodiment, the present invention proposes a method for ciphering a standardized stream of compressed audio or video data, wherein at least one part of the bits of a data packet delimited by two successive synchronization markers is ciphered by a pseudo-random stream.

As the stream cipher is carried out bit by bit, the position in a ciphered data packet of a ciphered bit is the same as the one occupied by the corresponding data bit in the data packet, before ciphering. Furthermore, the status of a ciphered bit (or respectively, a non-ciphered bit) does not affect the neighboring bits. This cipher method is compatible with the variations in the number of bits to be ciphered from one packet to another. No data bit to be ciphered is therefore left in plain text. Furthermore, the deciphering of a stream ciphered packet can be carried out backwards starting from the initial synchronization marker of the following packet. The method avoids the cipher propagating isolated errors caused by the transmission and affecting only one or more bits inside a ciphered data packet, which is not possible with a block cipher. The method also enables a truncated packet to be deciphered to adapt the stream to a reduced bandwidth.

To prevent fraudulent deciphering attempts, a different (single) pseudo-random stream is used for each packet of the data stream: at each synchronization marker of the data stream, a new pseudo-random stream is generated that is "XORed" bit by bit with the data bits to be ciphered (i.e. that is applied to "exclusive OR" gates), and the ciphered data bits are put back in the stream at the place they respectively occupied before ciphering.

Preferably, a cipher stream of a determined packet is generated by processing a non-ciphered datum of the determined packet, called second non-ciphered datum, by processing a non-ciphered datum of the data stream that does not belong to the determined packet, called first non-ciphered datum, and by processing a single secret key that is preferably characteristic of the stream.

Still preferably, the non-ciphered datum of the determined packet is a header datum of the packet, and the non-ciphered datum of the data stream that does not belong to the determined packet, is a time marker of the stream or "time stamp".

According to a preferred mode of implementation, to generate a single pseudo-random stream (different from the other pseudo-random streams) for each packet of the data stream, one or more header data of the packet and/or of the data stream in question are used, particularly a time stamp of the group of images in which the packet in question is included, which can be associated with an index such as the index of the first macroblock of the packet in question, to form a combination of data that is specific to the packet in question.

Preferably, in addition, the first and second non-ciphered data are block-ciphered using a secret key; for that purpose, a 64-bit, 128-bit, 192-bit, or 256-bit block cipher algorithm is preferably used to generate, for each data packet, a pseudo-random stream using a key and data characteristic of the packet in question.

In order to increase the resistance of the cipher to "attacks" (fraudulent deciphering attempts) using knowledge of non-ciphered portions (in plain text) of the data stream, a hashing algorithm is preferably used in addition to produce the cipher stream of the data of the determined packet, using the result of the block cipher of the first and second non-ciphered data.

When, as is the case for the MPEG4 standard, at least one part of the data of the stream has been coded into words of variable length, only the bits of these codewords are ciphered, which, after being ciphered and put back in the codeword, comply with the structure of codewords of the stream of data to be ciphered. Preferably, for that purpose, for codewords of a table of codewords that do not all have the same length, preferably for each codeword of the table, at least one part of the bits is ciphered—and preferably all the bits—which is/are such that, after randomly changing their value(s) and after replacing bit by bit in the codeword to be ciphered the non-ciphered bits with the ciphered bits, a second codeword of the table of codewords is obtained. The length of the codeword is thus invariant during this cipher. In other words, the codewords of at least one group of several codewords (and preferably of all the groups of several codewords) of the table that have the same length are mixed (swapped).

According to a preferred embodiment of the present invention, an index for identifying each codeword in the table is added to the table of codewords of different lengths, as well as at least one parameter which defines, for each codeword of the table, the number—and possibly the position in the codeword—of the bit(s) to be ciphered.

To cipher a series of codewords of a packet of the data stream, the number and the position of the bits to be ciphered in the word are determined for each codeword, using this table; the bit(s) to be ciphered is/are extracted from the word and is/are placed in a buffer by concatenating in this buffer the bits to be ciphered that have been extracted from the codewords of the series of codewords. When this buffer is full or when a synchronization marker of the start of the following packet has been reached, the string of bits present in the buffer is ciphered and each of the ciphered bits is put back at the place it respectively occupied before ciphering in the corresponding codeword of the series of codewords of the packet. Thus, after ciphering, a data stream complying with the compression standard is obtained.

To decipher a series of so-ciphered codewords, the opposite operations are carried out: the ciphered bits are extracted from each word of the stream and are placed in a buffer. When this buffer is full or when a synchronization marker of the following packet has been reached, the series of bits that it contains is deciphered, then each extracted, ciphered bit is replaced in the stream respectively with the deciphered bit that has the same position in the buffer. The buffer is then emptied before processing the words of the following packet in the same way.

Alternatively, each bit to be ciphered in the data stream is continuously ciphered ("streaming"), after being extracted from the stream, using an XOR operation with the corresponding bit of a block of the pseudo-random cipher stream, it is then put back at the place it previously occupied in the data stream. The monitoring, in the block of the pseudo-random cipher stream, of the number of the bit to be used for the XOR, can be carried out with a counter that is incremented at each new ciphered bit. This method removes the need to store the bits to be ciphered in a buffer, as well as the rest of the packet awaiting the missing bits. Therefore, it reduces both the cost in memory and the processing times caused by these storage operations.

The advantages of this continuous cipher method by pseudo-random stream are particularly significant for the deciphering, that generally takes place on hardware platforms the computing capacity and memory of which are limited.

To decipher a data stream ciphered with this method, the same method as the one employed for ciphering is used: each bit to be deciphered in the ciphered data stream is continuously deciphered ("streaming"), after being extracted from the stream, using an XOR operation with the corresponding bit of the pseudo-random decipher block.

According to another embodiment, the present invention proposes a computer-readable medium on which a program code is saved that implements the operations defined above, to enable the computer to cipher a compressed data stream, or conversely to decipher a stream of compressed data ciphered according to the present invention.

The method enables streams of coded data with reversible or otherwise, signed or unsigned code words of variable length to be ciphered, while preserving the coding syntax of the stream.

In the case of tables of signed codewords, the method also enables a more complete data scrambling to be obtained (particularly images or sounds), compared to the methods that only cipher the sign bit.

According to another embodiment, the present invention proposes an encoder (or a decoder) of compressed and formatted audio or video data, that comprises:

a table of codewords of different lengths, the table comprising, for each word, an index and a parameter defining the bits of the word to be (de)ciphered, a first buffer provided for temporarily receiving the selected data bits with a view to their (de)ciphering, stream (de)cipher means capable of (de)ciphering the bits stored in the buffer, which preferably comprise:

a second buffer for storing data (D1, D2) characteristic of a data packet to be (de)ciphered;

means for (de)ciphering the data characteristic of a packet by a key, the resulting data of which are processed by hashing means to produce a pseudo-random cipher stream characteristic of the packet;

a third buffer for temporarily storing the pseudo-random stream, with a view to its application to "exclusive OR" gates to cipher the data bits of the first buffer;

means for activating the stream (de)cipher means, to cause the (de)ciphering of the bits stored in the first buffer when the first buffer is full or when a synchronization marker of the start of the packet following the packet in question has been reached, to replace the bits selected in the data packet with the bits stored and (de)ciphered, and to empty the buffers.

BRIEF DESCRIPTION OF THE SEVERAL VIEWS OF THE DRAWINGS

Other features and advantages of the present invention are explained in the following description, that refers to the appended drawings and that shows without limitation preferred embodiments and examples of embodiments of the present invention.

DETAILED DESCRIPTION OF THE INVENTION

Figure 3:
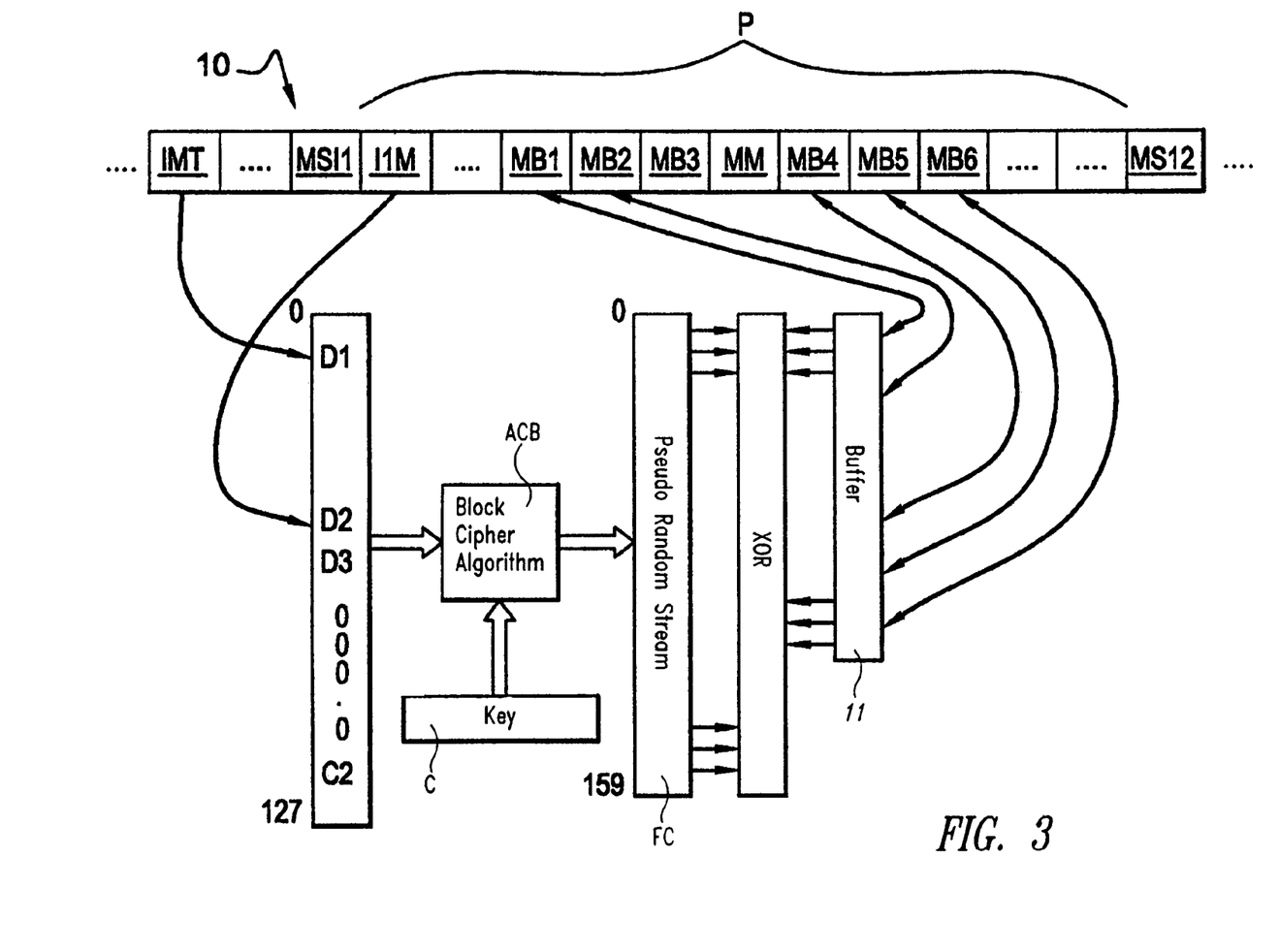
FIG. 3 is a diagram showing the cipher of a series of words of a packet of a data stream, in accordance with the present invention.

With reference to FIG. 3, the cipherable bits of the RVLC-coded part ("reversible variable length coding") of an MPEG4 packet are ciphered not with a block cipher, but with stream cipher FC, which leaves the ciphered bits in place. This avoids the cipher propagating random errors caused by the transmission ("wireless type").

The packet P comprises a series of macroblocks MB1, . . . , MB3 of motion data, a separation marker MM, followed by a series of macroblocks MB4, . . . , MB6, . . . of texture data.

At each initial synchronization marker MSI1 of a packet P of the video data stream 10, a new pseudo-random stream FC is generated that is XORed bit by bit with each of the useful data bits to be ciphered that have previously been extracted from the stream 10 and put into a register or buffer 11. The so-ciphered bits are then put back at their place; only the bits that enable compliance with the compression standard to be maintained are ciphered, i.e. the sign bits and some additional bits, as described below.

To ensure security, whereas the block cipher is deemed to be more secure, each pseudo-random cipher stream of the packets, such as P for example (limited by two successive synchronization markers MSI1 and MSI2) should be unique.

To ensure error tolerance, it should be possible for the pseudo-random stream FC to be secretly transmitted from the encoder to the decoder, and without any error, even if the video data stream 10 is subject to errors.

To ensure adaptability to the variable bandwidth, if only the start of the ciphered packet P is received, it should be possible for the start of the packet P to be ciphered nevertheless. This is ensured by the fact that each ciphered bit is independent of the other ciphered bits, and is located at the place of the corresponding plain-text bit.

The pseudo-random stream is generated by a single key C, that is linked, for example, to the video document to be ciphered, and by data that often change, which are error-protected, and never recur. In an MPEG stream, after the start of image markers ("VOP start code") such as IMT (FIG. 3), there is generally a time marker or "time stamp": in a same film, the time stamp is never the same. Therefore, a cipher stream calculated using these stamps will never repeat itself. In another film or data stream, the same time stamps could be found but as the key C of the document is different, the cipher streams FC will be different.

The key is transmitted to the decoder independently of the stream, for example by a public key protocol. If a time stamp IMT is only present at the start of each image (or "video object plane"), the datum D1 corresponding to this stamp can be combined with a second datum D2 such as the first-macroblock index I1M of the video packet P to be ciphered. This combination is therefore unique in the whole film.

To combine the key C and the data D1 and D2 so as to generate a pseudo-random stream FC very different from another pseudo-random stream generated with the same key and a datum D1 (time stamp) that is not very different from the first time stamp of the previous packet, the combined data D1 and D2 are ciphered (complemented to 64 or 128 bits for example with "0"s) with a block cipher algorithm ACB such as DES, the key C being the single secret key for all of the packets of the stream. The result is passed into a hashing algorithm (such as the SHA1 standard), the purpose of which is, on the one hand, to give a message FC of fixed length at output, for example 160 bits for SHA1, and on the other hand, to give a very different message at output if the input varies little, even by a single bit.

This algorithm SHA1 delivers 160 bits at output used by XOR with the useful bits to be ciphered. If between two successive synchronization markers (such as MSI1 and MSI2 for the packet P), there are less than 160 bits to be ciphered, only the first bits of the output of SHA1 will be used. If, on the contrary, there are more than 160, it is sufficient to generate another 160-bit cipher stream block FC, using the single key C, the same data D1 and D2, and an index D3 that is incremented. Thus, if a single block of the cipher stream FC is not big enough to cipher all the bits of the packet P in question, one or more additional blocks FC are generated, the last one of which may possibly not be entirely used. To ensure the uniqueness of each block of the cipher stream, an additional index D3 is added in the input block and is incremented at each new block of the cipher stream used for a determined packet.

Thus, the cipher stream FC of the data bits of the video packet can be obtained with one of the formulas:

$$FC=SHA1(\text{single } DES\text{key}((\text{time stamp})\& \text{ index } \& [\text{complement to 64 bits}])),$$

or $$FC=SHA1(\text{single } AES\text{key}((\text{time stamp})\& \text{ index } \& [\text{complement to 128 bits}])),$$

depending on whether a DES or AES cipher is used to produce the cipher stream FC.

It is possible to use alternatives of this method combining a single key with a time stamp.

To obtain a cipher stream made up of a series of blocks of fixed size, various symmetric block cipher algorithms can be used such as "twofish", "serpent", or the alternatives of AES with 192 or 256 bits for the data and/or the key.

To reduce the predictability of the input data of the block cipher algorithm ACB used to produce the cipher stream, a second key (C2 FIG. 3) can be included in these input data; this key can be changed for each data stream (such as a film) to be ciphered, or can be changed at regular time intervals (every minute or second for example) for a determined data stream (film), so as to increase the security level; this second key can be transmitted separately from the data stream, by causing a negligible increase in the data rate to be transmitted, or can be calculated by a pseudo-random algorithm known by the decoder, using the first key (or main key).

If some transmission errors of the data stream 10 occur, the pseudo-random stream FC can be regenerated by the decoder, as described above for the cipher, provided that the plain-text data D1 and D2 have not been affected by the errors (the main key C being transmitted to the decoder separately from the stream 10); this will generally be the case, since a time stamp represents about twenty bits per packet, whereas the useful data of a packet can represent several thousands of bits.

This method is therefore compatible with the tools of the MPEG4 standard enabling the packet errors and the isolated errors to be remedied.

The use of a hashing function to produce each block of the cipher stream increases the resistance of the cipher to attacks based on the knowledge of non-ciphered portions of the data stream.

These non-ciphered portions can be made up of one or more completely black images, or of one or more images bearing the mark of a video producer, like those generally present in the credits of a film; the knowledge of these non-ciphered images and of the corresponding ciphered data of the stream enables an "attacker" to determine several blocks of the cipher stream, by applying the ciphered data and the corresponding non-ciphered data to the inputs of "exclusive OR" gates; if these blocks have not undergone a hashing, it is then possible to determine all or part of the key; on the contrary, thanks to the broadcasting property of the hashing algorithms, it is difficult—or even impossible—to determine the key using knowledge of blocks of the cipher stream, once these blocks have been hashed.

The selection of the useful data bits to be ciphered, which are extracted from the macroblocks MB1 to MB3 of motion data and from the macroblocks MB4 to MB6 (and following) of texture data, is now described with reference to FIGS. 1A, 1B, and 2.

The following example, described with reference to FIGS. 1A and 1B, refers to table B-12 of codewords for the coding of the motion vectors.

Figure 1A:
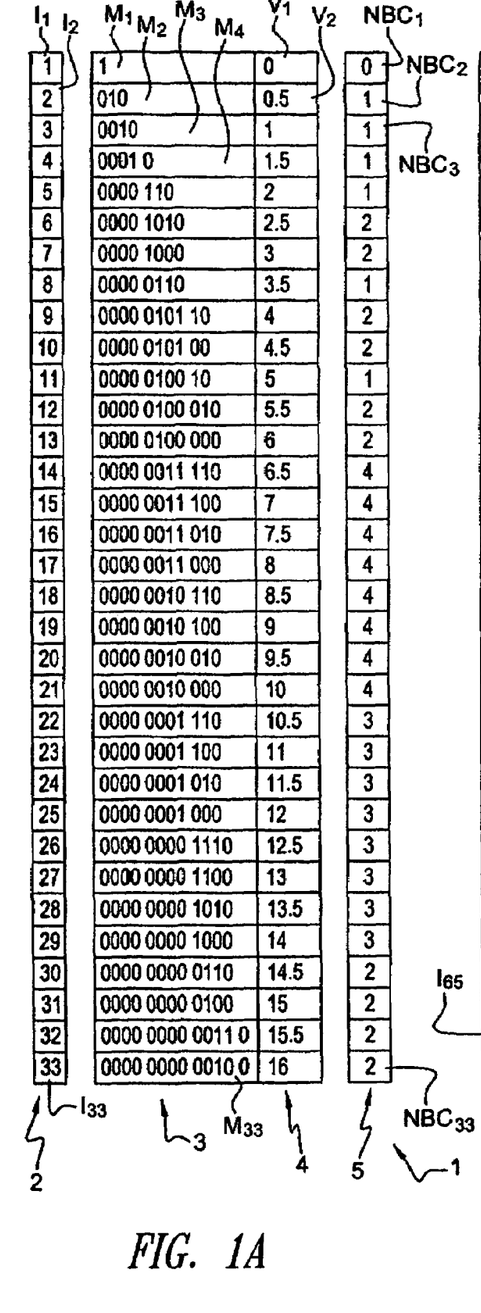
FIGS. 1A and 1B represent a table used according to the present invention, which incorporates table B-12 of schedule B to the MPEG4 standard (ISO 14496-2) as well as a column of indexes respectively associated with each word, and a column of parameters indicating the number of cipherable bits of each word.
Figure 1B:
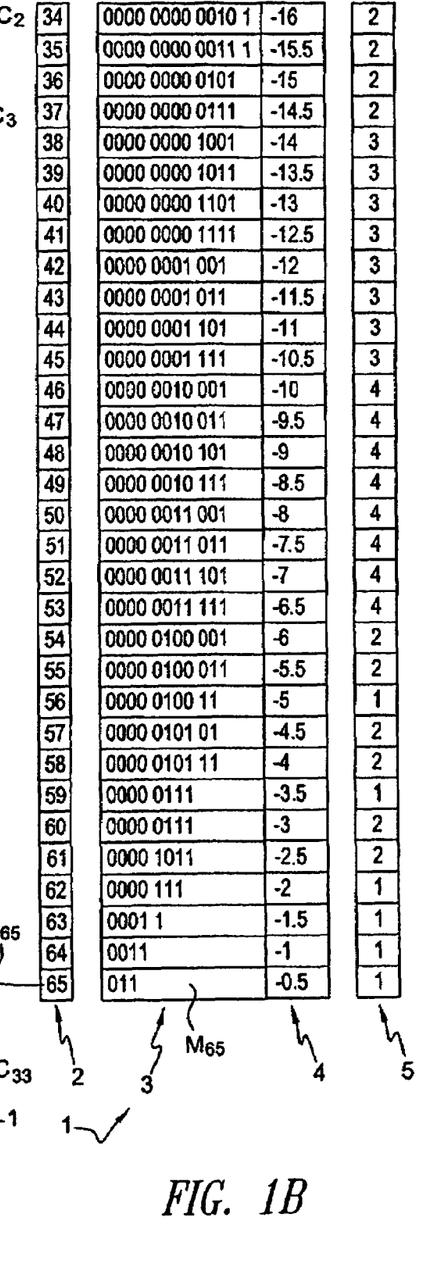

With reference to FIGS. 1A and 1B, table 1 comprises four columns 4, 3, 2, 5 respectively comprising:
- values V, in this case, motion vector difference values, such as V1 and V2;
- codewords M respectively associated with the different values V to be coded, such as M1, M2, M3, M4, M33, M65;
- indexes I ranging from 1 to 65, to respectively identify each word M of the table, such as I1, I2, I33, I65;
- parameters NBC respectively associated with each word M of the table, such as NBC1, NBC2, NBC3, NBC33, to define the number of bits of the word in question the replacement of which with the complementary bit produces another word of table 1.

It can be seen on this Figure that most of the codewords M of at least eight bits comprise a number NBC of cipherable bits equal to two, three or four; in particular, in the group of the four codewords of thirteen bits, of which the word M33 is part, two bits of each word can be complemented (inverted).

As described above, the cipherable bits of this table are the bits grouped on the right of each codeword; if this is not the case, the table must further contain, for each codeword M, the position information of each cipherable bit of this word.

To cipher a series of codewords M forming one of the macroblocks MB1, . . . , MB3 of motion data of the data packet, the number NBC of cipherable bits of the 1st word M is read in table 1; the cipherable bits of the word M are transferred into the buffer 11 (FIG. 3); the operation is repeated for the subsequent words of the stream 10 to be ciphered, and the cipherable bits extracted from these words are gradually concatenated in the buffer 11, until it is full or until the end of the packet; at this moment, the bits of the buffer 11 are ciphered by presenting them, as well as the cipher stream FC, at the inputs of 160 "exclusive OR" gates; the ciphered bits delivered at output are put back—bit by bit—in the stream of words, at the respective positions of the bits extracted from the stream 10, so as to form a ciphered stream.

Alternatively, the cipherable bits can be continuously ciphered ("streaming"), as described above.

To decipher a packet—or a portion of a truncated packet—of a data stream ciphered according to the present invention, the stream is analyzed from left to right; when a codeword is analyzed by an MPEG decoder, a decision is made at each bit; after reading the last non-ciphered bit of a ciphered word, the decoder determines the group of ciphered words of the table corresponding to the non-ciphered bits which have already been read and consequently determines the number of ciphered bits following the last bit "in plain text"; when, for example, the sequence of bits "in plain text" is "000010", reading table 1 makes it possible to determine that the ciphered word comprises two ciphered bits, which follow these non-ciphered bits.

The processing of these bits is then identical to that used for the cipher: the bits to be deciphered are concatenated in a buffer, until it is full or until the end of the packet; the content of the buffer can be applied bit by bit to the inputs of XOR gates with a decipher stream generated in the same way as previously indicated for the cipher; the deciphered bits at the outputs of the gates are put back in the stream to be deciphered, bit by bit, at the positions previously occupied by the ciphered bits.

Figure 2:
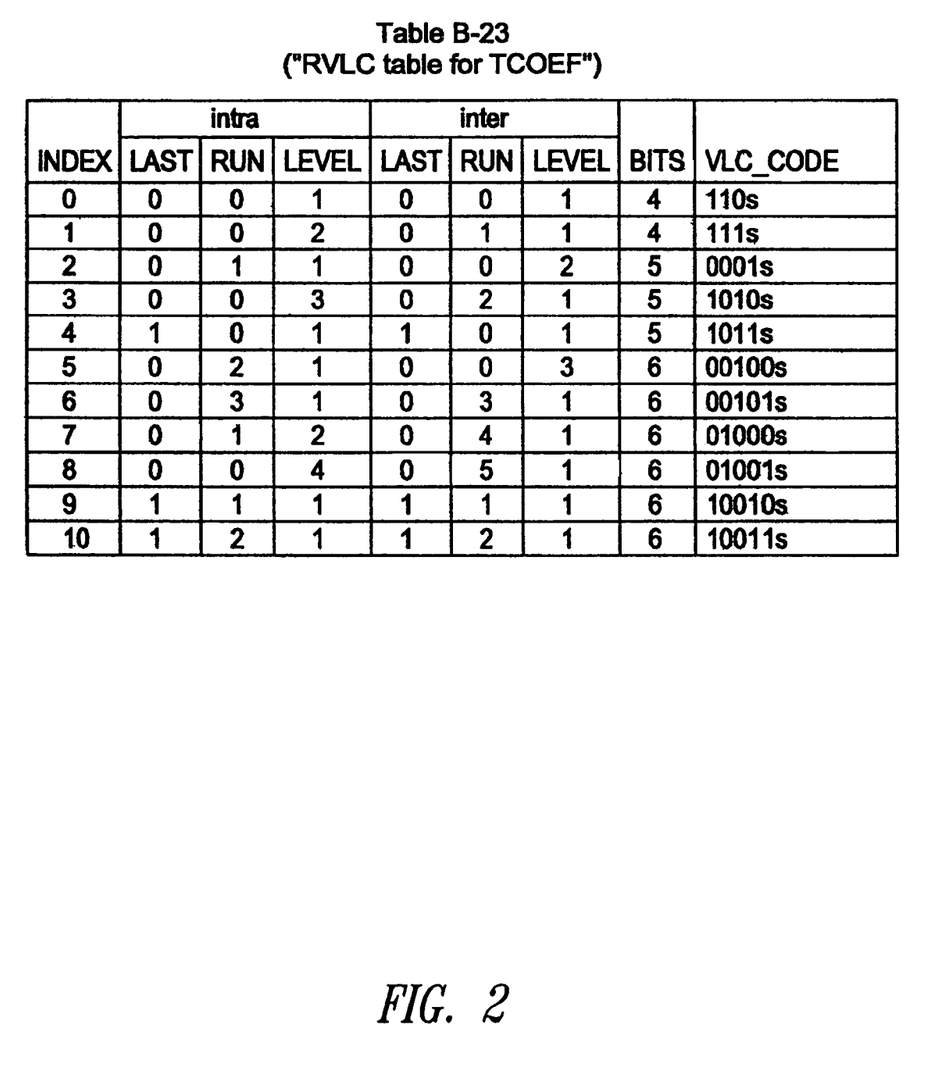
FIG. 2 is a part of table B-23 of schedule B to this standard.

Data processing identical or similar to the one that has just been described can be used for the data compressed by the reversible codewords of table B-23, the first 11 codes of which appear in FIG. 2: the sign bits that can be ciphered appear on a dark grey background; those that can also be ciphered according to the method described above for table B-12 appear on a light grey background.

Figure 4:
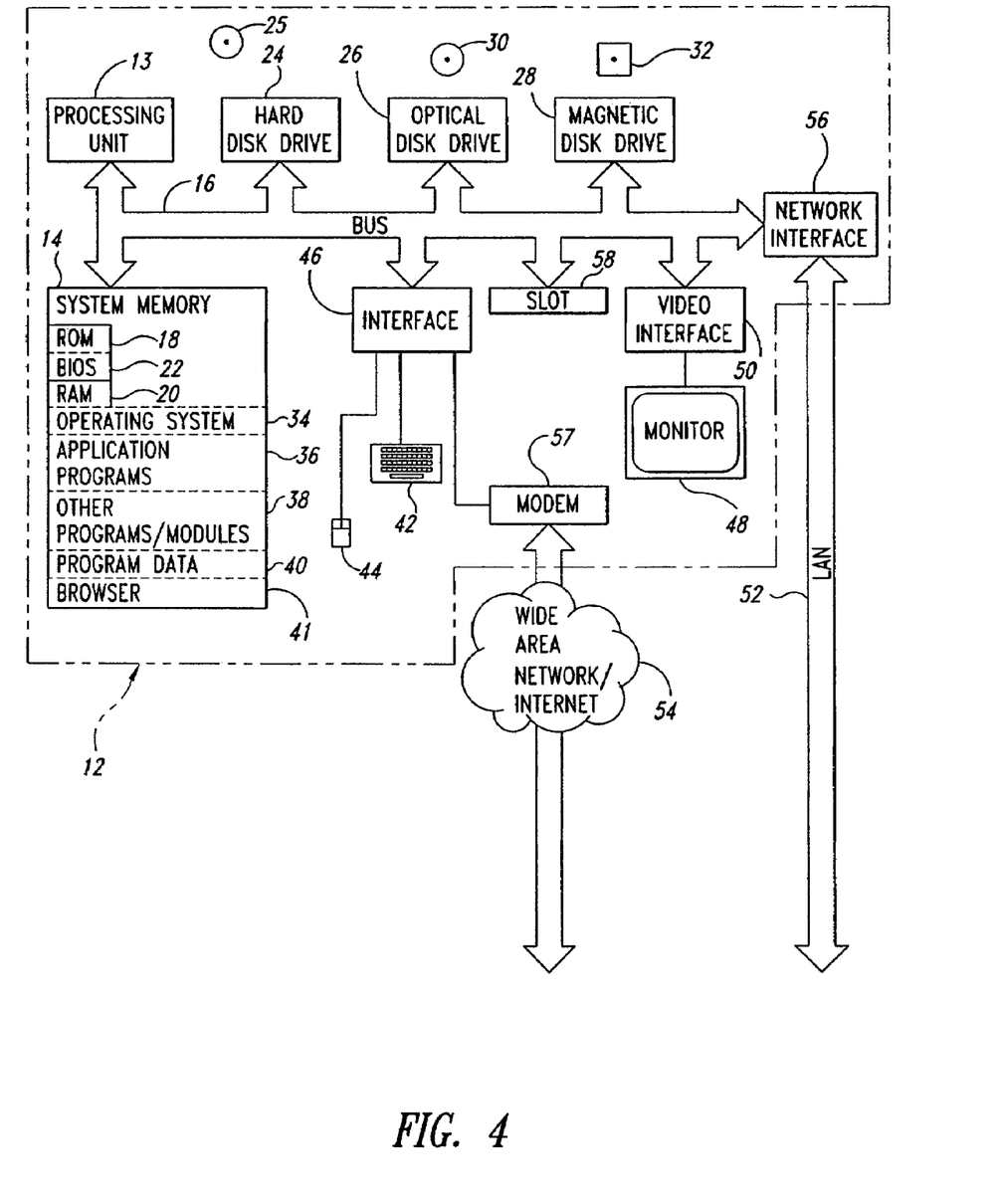
FIG. 4 is a computer system for implementing one embodiment of the present invention.

Those skilled in the art will recognize that the method described above may be implemented in a general purpose computer system. FIG. 4 and the following discussion provide a brief, general description of a suitable computing environment in which the invention may be implemented. Although not required, at least one embodiment of the invention can be implemented in the general context of computer-executable instructions, such as program application modules, objects, or macros being executed by a personal computer. Those skilled in the relevant art will appreciate that the invention can be practiced with other computing system configurations, including handheld devices, multiprocessor systems, microprocessor-based or programmable consumer electronics, network PCs, minicomputers, mainframe computers, and the like. The invention can be practiced in distributed computing environments where tasks or modules are performed by remote processing devices, which are linked through a communications network. In a distributed computing environment, program modules may be located in both local and remote memory storage devices.

Referring to FIG. 4, a personal computer referred to herein as a computing system 12 includes a processing unit 13, a system memory 14 and a system bus 16 that couples various system components including the system memory 14 to the processing unit 13. The processing unit 13 may be any logical processing unit, such as one or more central processing units (CPUs), digital signal processors (DSPs), application-specific integrated circuits (ASIC), etc. Unless described otherwise, the construction and operation of the various blocks shown in FIG. 4 are of conventional design. As a result, such blocks need not be described in further detail herein, as they will be understood by those skilled in the relevant art.

The system bus 16 can employ any known bus structures or architectures, including a memory bus with memory controller, a peripheral bus, and/or a local bus. The system memory 14 includes read-only memory ("ROM") 18 and random access memory ("RAM") 20. A basic input/output system ("BIOS") 22, which can form part of the ROM 18, contains basic routines that help transfer information between elements within the computing system 12, such as during startup.

The computing system 12 also includes one or more spinning media memories such as a hard disk drive 24 for reading from and writing to a hard disk 25, and an optical disk drive 26 and a magnetic disk drive 28 for reading from and writing to removable optical disks 30 and magnetic disks 32, respectively. The optical disk 30 can be a CD-ROM, while the magnetic disk 32 can be a magnetic floppy disk or diskette. The hard disk drive 24, optical disk drive 26 and magnetic disk drive 28 communicate with the processing unit 13 via the bus 16. The hard disk drive 24, optical disk drive 26 and magnetic disk drive 28 may include interfaces or controllers coupled between such drives and the bus 16, as is known by those skilled in the relevant art, for example via an IDE (i.e., Integrated Drive Electronics) interface. The drives 24, 26 and 28, and their associated computer-readable media, provide nonvolatile storage of computer-readable instructions, data structures, program modules and other data for the computing system 12. Although the depicted computing system 12 employs hard disk 25, optical disk 30 and magnetic disk 32, those skilled in the relevant art will appreciate that other types of spinning media memory computer-readable media may be employed, such as, digital video disks ("DVD"), Bernoulli cartridges, etc. Those skilled in the relevant art will also appreciate that other types of computer-readable media that can store data accessible by a computer may be employed, for example, non-spinning media memories such as magnetic cassettes, flash memory cards, RAMs, ROMs, smart cards, etc.

Program modules can be stored in the system memory 14, such as an operating system 34, one or more application programs 36, other programs or modules 38, and program data 40. The system memory 14 also includes a browser 41 for permitting the computing system 12 to access and exchange data with sources such as websites of the Internet, corporate intranets, or other networks, as well as other server applications on server computers. The browser 41 is markup language based, such as hypertext markup language ("HTML"), and operate with markup languages that use syntactically delimited characters added to the data of a document to represent the structure of the document.

While shown in FIG. 4 as being stored in the system memory, the operating system 34, application programs 36, other program modules 38, program data 40 and browser 41 can be stored on the hard disk 25 of the hard disk drive 24, the optical disk 30 and the optical disk drive 26 and/or the magnetic disk 32 of the magnetic disk drive 28. A user can enter commands and information to the computing system 12 through input devices such as a keyboard 42 and a pointing device such as a mouse 44. Other input devices can include a microphone, joystick, game pad, scanner, etc. These and other input devices are connected to the processing unit 13 through an interface 46 such as a serial port interface that couples to the bus 16, although other interfaces such as a parallel port, a game port or a universal serial bus ("USB") can be used. A monitor 48 or other display devices may be coupled to the bus 16 via video interface 50, such as a video adapter. The computing system 12 can include other output devices such as speakers, printers, etc.

The computing system 12 can operate in a networked environment using logical connections to one or more remote computers. The computing system 12 may employ any known means of communications, such as through a local area network ("LAN") 52 or a wide area network ("WAN") or the Internet 54. Such networking environments are well known in enterprise-wide computer networks, intranets, and the Internet.

When used in a LAN networking environment, the computing system 12 is connected to the LAN 52 through an adapter or network interface 56 (communicatively linked to the bus 16). When used in a WAN networking environment, the computing system 12 often includes a modem 57 or other device for establishing communications over the WAN/Internet 54. The modem 57 is shown in FIG. 1 as communicatively linked between the interface 46 and the WAN/Internet 54. In a networked environment, program modules, application programs, or data, or portions thereof, can be stored in a server computer (not shown). Those skilled in the relevant art will readily recognize that the network connections shown in FIG. 4 are only some examples of establishing communication links between computers, and other links may be used, including wireless links.

The computing system 12 may include one or more interfaces such as slot 58 to allow the addition of devices either internally or externally to the computing system 12. For example, suitable interfaces may include ISA (i.e., Industry Standard Architecture), IDE, PCI (i.e., Personal Computer Interface) and/or AGP (i.e., Advance Graphics Processor) slot connectors for option cards, serial and/or parallel ports, USB ports (i.e., Universal Serial Bus), audio input/output (i.e., I/O) and MIDI/joystick connectors, and/or slots for memory.

The term "computer-readable medium" as used herein refers to any medium that participates in providing instructions to processing unit 13 for execution. Such a medium may take many forms, including but not limited to, non-volatile media, volatile media, and transmission media. Non-volatile media includes, for example, hard, optical or magnetic disks 25, 30, 32, respectively. Volatile media includes dynamic memory, such as system memory 14. Transmission media includes coaxial cables, copper wire and fiber optics, including the wires that comprise system bus 16. Transmission media can also take the form of acoustic or light waves, such as those generated during radio wave and infrared data communications.

Common forms of computer-readable media include, for example, a floppy disk, a flexible disk, hard disk, magnetic tape, or any other magnetic medium, a CD-ROM, any other optical medium, punch cards, paper tape, any other physical medium with patterns of holes, a RAM, a PROM, and EPROM, a FLASH-EPROM, any other memory chip or cartridge, a carrier wave as described hereinafter, or any other medium from which a computer can read.

Various forms of computer readable media may be involved in carrying one or more sequences of one or more instructions to processing unit 13 for execution. For example, the instructions may initially be carried on a magnetic disk of a remote computer. The remote computer can load the instructions into its dynamic memory and send the instructions over a telephone line using a modem. The modem 57 local to computer system 10 can receive the data on the telephone line and use an infrared transmitter to convert the data to an infrared signal. An infrared detector coupled to the system bus 16 can receive the data carried in the infrared signal and place the data on system bus 16. The system bus 16 carries the data to system memory 14, from which processing unit 13 retrieves and executes the instructions. The instructions received by system memory 14 may optionally be stored on storage device either before or after execution by processing unit 13.

All of the above U.S. patents, U.S. patent application publications, U.S. patent applications, foreign patents, foreign patent applications and non-patent publications referred to in this specification and/or listed in the Application Data Sheet, are incorporated herein by reference, in their entirety.

From the foregoing it will be appreciated that, although specific embodiments of the invention have been described herein for purposes of illustration, various modifications may be made without deviating from the spirit and scope of the invention. Accordingly, the invention is not limited except as by the appended claims.

The invention claimed is:

1. A method for ciphering a compressed audio or video data stream that includes a plurality of data packets each having data bits to be ciphered and each delimited by two consecutive synchronization markers, the method comprising:
for each data packet, producing a new pseudo-random cipher stream at each initial synchronization marker of the data packet, each pseudo-random cipher stream being different for each data packet;
for each data packet, applying the cipher stream for the data packet bit by bit, with the data bits to be ciphered for the data packet, using an "exclusive OR" function, to obtain ciphered data bits; and
replacing in the data stream data bits to be ciphered with the ciphered data bits at positions the data bits to be ciphered respectively occupied before ciphering;
wherein each cipher stream is generated by processing non-ciphered data of the data stream and wherein the compressed audio or video data to which the method is applied are partly coded by tables of reversible codewords of variable length and of non-reversible codewords of variable length, which are signed or unsigned.

2. The method according to claim 1 wherein the data bits to be ciphered are all bits of the packet that result in codewords of the codeword table, after being subjected to the producing and applying steps.

3. The method according to claim 1, further comprising adding to the table of codewords an index for identifying each codeword of the table, as well as at least one parameter which defines, for each codeword of the table, a number and a position, in the codeword, of each bit to be ciphered.

4. The method according to claim 1 wherein each data packet includes a series of codewords, the method comprising, for each data packet:
determining, for each codeword of the data packet, a number and a position of each bit to be ciphered in the codeword, using the table;
extracting the bit(s) to be ciphered from the codeword and putting the extracted bit(s) into a buffer by concatenating in this buffer the bits to be ciphered that have been extracted from the codewords of the data packet; and
when this buffer is full or when all the bits to be ciphered have been extracted from the data packet, the bits present in the buffer is ciphered by the cipher stream for the data packet to produce the ciphered bits and the ciphered bits are put in the data packet at the positions of the corresponding bits that were ciphered.

5. A method for ciphering a compressed audio or video data stream that includes a plurality of data packets each having data bits to be ciphered and each delimited by two consecutive synchronization markers, the method comprising:
for each data packet, producing a new pseudo-random cipher stream at each initial synchronization marker of the data packet, each pseudo-random cipher stream being different for each data packet;
for each data packet, applying the cipher stream for the data packet bit by bit, with the data bits to be ciphered for the data packet, using an "exclusive OR" function, to obtain ciphered data bits; and
replacing in the data stream data bits to be ciphered with the ciphered data bits at positions the data bits to be ciphered respectively occupied before ciphering;
wherein each cipher stream is generated by processing non-ciphered data of the data stream and for each data packet, the producing step produces at least one block of the cipher stream for the data packet by ciphering at least one non-ciphered datum of the data stream by a symmetric block cipher algorithm, and then by applying a hashing algorithm to a result of the block cipher of the non-ciphered datum.

6. The method according to claim 5 wherein the data stream is a data stream transmitted in truncated form in a reduced-bandwidth channel.

7. The method according to claim 5 further comprising, for one of the data packets, producing plural blocks of the pseudo-random cipher stream for the data packet, the blocks being differentiated by at least one index.

8. A method for ciphering a compressed audio or video data stream that includes a plurality of data packets each having data bits to be ciphered and each delimited by two consecutive synchronization markers, the method comprising:
for each data packet, producing a new pseudo-random cipher stream at each initial synchronization marker of the data packet, each pseudo-random cipher stream being different for each data packet;
for each data packet, applying the cipher stream for the data packet bit by bit, with the data bits to be ciphered for the data packet, using an "exclusive OR" function, to obtain ciphered data bits; and
replacing in the data stream data bits to be ciphered with the ciphered data bits at positions the data bits to be ciphered respectively occupied before ciphering;
wherein each cipher stream is generated by processing non-ciphered data of the data stream and for each data packet, the producing step comprises processing a non-ciphered datum of the data packet by using a secret key, unique and characteristic of the data stream.

9. The method according to claim 8 wherein, for each data packet, the producing step uses a 64-bit, 128-bit, 192-bit, or 256-bit block cipher algorithm to generate the pseudo-random cipher stream for the data packet.

10. A method for ciphering a compressed audio or video data stream that includes a plurality of data packets each having data bits to be ciphered and each delimited by two consecutive synchronization markers, the method comprising:
for each data packet, producing a new pseudo-random cipher stream at each initial synchronization marker of the data packet, each pseudo-random cipher stream being different for each data packet;
for each data packet, applying the cipher stream for the data packet bit by bit, with the data bits to be ciphered for the data packet, using an "exclusive OR" function, to obtain ciphered data bits; and
replacing in the data stream data bits to be ciphered with the ciphered data bits at positions the data bits to be ciphered respectively occupied before ciphering;
wherein each cipher stream is generated by processing non-ciphered data of the data stream and wherein for each data packet, the producing step comprises processing a non-ciphered datum, not belonging to the data packet, by using a secret first key, unique and characteristic of the stream.

11. The method according to claim 10 wherein for each data packet, the producing step comprises processing a non-ciphered datum of the data packet by using the first key, the non-ciphered datum of the data packet being a header datum of the packet, and wherein the non-ciphered datum of the data stream that does not belong to the data packet, is a time marker of one part of the data stream which includes the data packet, called "time stamp".

12. The method according to claim 10 wherein the producing step comprises block-ciphering the non-ciphered data using the first key.

13. The method according to claim 12 wherein, for each data packet, the producing step comprises using a hashing algorithm to produce the cipher stream using a result of the block cipher of the non-ciphered data.

14. The method according to claim 10, further comprising calculating a second key using a pseudo-random algorithm to combine the first key with the non-ciphered data.

15. A digital encoder/decoder that ciphers or deciphers an input data stream that is either a compressed audio or video data stream or a ciphered data stream, the input data stream including plural data packets that each include plural input codewords, the encoder/decoder comprising:
    an input buffer configured to temporarily store input data bits of each data packet;
    a memory to store a table of stored codewords of different lengths, the table including, for each stored codeword, an index and a parameter defining bits of the codeword to be ciphered or deciphered;
    stream cipher and decipher circuitry configured to process the input data stream by:
        for each data packet, producing a new pseudo-random cipher stream at an initial synchronization marker of the data packet, each pseudo-random cipher stream being different for each data packet;
        for each data packet, applying the cipher stream for the data packet bit by bit, with input data bits of the data packet, using an "exclusive OR" function, to obtain ciphered or deciphered data bits; and
        for each data packet, replacing in the data packet the input data bits with the ciphered or non-ciphered data bits at positions the input data bits respectively occupied before being replaced, the cipher stream of each data packet being generated by processing non-ciphered data of the data stream; and
    a controller configured to cause the stream cipher and decipher circuitry to:
        apply the exclusive OR function to the bits stored in the buffer when the buffer is full or when a synchronization marker of a subsequent data packet has been reached; and
        replace input bits of the input data stream with the bits ciphered or deciphered; and
        empty the buffer.

16. A computer-readable medium, on which a program code is saved that causes a computer to cipher a compressed data stream, that includes a plurality of data packets each having data bits to be ciphered and each delimited by two consecutive synchronization markers, by a method comprising:
    for each data packet, producing a new pseudo-random cipher stream at each initial synchronization marker of the data packet, each pseudo-random cipher stream being different for each data packet;
    for each data packet, applying the cipher stream for the data packet bit by bit, with the data bits to be ciphered for the data packet, using an "exclusive OR" function, to obtain ciphered data bits; and
    replacing in the data stream data bits to be ciphered with the ciphered data bits at positions the data bits to be ciphered respectively occupied before ciphering, wherein each cipher stream is generated by processing non-ciphered data of the data stream and for each data packet, the producing step produces at least one block of the cipher stream for the data packet by ciphering at least one non-ciphered datum of the data stream by a symmetric block cipher algorithm, and then by applying a hashing algorithm to a result of the block cipher of the non-ciphered datum.

17. A computer-readable medium, on which a program code is saved that causes a computer to cipher a compressed data stream, that includes a plurality of data packets each having data bits to be ciphered and each delimited by two consecutive synchronization markers, by a method comprising:
    for each data packet, producing a new pseudo-random cipher stream at each initial synchronization marker of the data packet, each pseudo-random cipher stream being different for each data packet;
    for each data packet, applying the cipher stream for the data packet bit by bit, with the data bits to be ciphered for the data packet, using an "exclusive OR" function, to obtain ciphered data bits; and
    replacing in the data stream data bits to be ciphered with the ciphered data bits at positions the data bits to be ciphered respectively occupied before ciphering, wherein each cipher stream is generated by processing non-ciphered data of the data stream, and for each data packet, the producing step comprises:
        block-ciphering the non-ciphered data using a secret first key; and
        using a hashing algorithm to produce the cipher stream for the data packet using a result of the block-ciphering of the non-ciphered data.

18. The computer-readable medium according to claim 17, the method further comprising calculating a second key using a pseudo-random algorithm to combine the first key with the non-ciphered data.

19. A computer-readable medium, on which a program code is saved that causes a computer to cipher a compressed data stream, that includes a plurality of data packets each having data bits to be ciphered and each delimited by two consecutive synchronization markers, by a method comprising:
    for each data packet, producing a new pseudo-random cipher stream at each initial synchronization marker of the data packet, each pseudo-random cipher stream being different for each data packet;
    for each data packet, applying the cipher stream for the data packet bit by bit, with the data bits to be ciphered for the data packet, using an "exclusive OR" function, to obtain ciphered data bits; and
    replacing in the data stream data bits to be ciphered with the ciphered data bits at positions the data bits to be ciphered respectively occupied before ciphering, wherein each cipher stream is generated by processing non-ciphered data of the data stream and the compressed data to which the method is applied comprises audio or video data partly coded by tables of reversible codewords of variable length and of non-reversible codewords of variable length, which are signed or unsigned, and wherein the data bits to be ciphered are all bits of the packet that result in codewords of the codeword table, after being subjected to the producing and applying steps.

20. A computer-readable medium, on which a program code is saved that causes a computer to cipher a compressed data stream, that includes a plurality of data packets each having data bits to be ciphered and each delimited by two consecutive synchronization markers, by a method comprising:
    for each data packet, producing a new pseudo-random cipher stream at each initial synchronization marker of the data packet, each pseudo-random cipher stream being different for each data packet;

for each data packet, applying the cipher stream for the data packet bit by bit, with the data bits to be ciphered for the data packet, using an "exclusive OR" function, to obtain ciphered data bits; and replacing in the data stream data bits to be ciphered with the ciphered data bits at positions the data bits to be ciphered respectively occupied before ciphering, wherein each cipher stream is generated by processing non-ciphered data of the data stream and the compressed data to which the method is applied comprises audio or video data partly coded by tables of reversible codewords of variable length and of non-reversible codewords of variable length, which are signed or unsigned, the method further comprising adding to the table of codewords an index for identifying each codeword of the table, as well as at least one parameter which defines, for each codeword of the table, a number and a position, in the codeword, of each bit to be ciphered.

21. A method for deciphering an audio or video ciphered data stream that includes a plurality of data packets each having input data bits to be deciphered and each delimited by two consecutive synchronization markers, the method comprising:

for each data packet, producing a new pseudo-random cipher stream at each initial synchronization marker of the data packet, each pseudo-random cipher stream being different for each data packet;

for each data packet, applying the cipher stream for the data packet bit by bit, with the input data bits for the data packet, using an "exclusive OR" function, to obtain deciphered data bits; and replacing in the data stream the input data bits with the ciphered data bits at positions the input data bits respectively occupied before deciphering, wherein each cipher stream is generated by processing non-ciphered data of the data stream and for each data packet, the producing step produces at least one block of the cipher stream for the data packet by ciphering at least one non-ciphered datum of the data stream by a symmetric block cipher algorithm, and then by applying a hashing algorithm to a result of the block cipher of the non-ciphered datum.

22. A method for deciphering an audio or video ciphered data stream that includes a plurality of data packets each having input data bits to be deciphered and each delimited by two consecutive synchronization markers, the method comprising:

for each data packet, producing a new pseudo-random cipher stream at each initial synchronization marker of the data packet, each pseudo-random cipher stream being different for each data packet;

for each data packet, applying the cipher stream for the data packet bit by bit, with the input data bits for the data packet, using an "exclusive OR" function, to obtain deciphered data bits; and replacing in the data stream the input data bits with the ciphered data bits at positions the input data bits respectively occupied before deciphering, wherein each cipher stream is generated by processing non-ciphered data of the data stream and for each data packet, the producing step comprises:

block-ciphering the non-ciphered data using a secret first key; and using a hashing algorithm to produce the cipher stream for the data packet using a result of the block-ciphering of the non-ciphered data.

23. The method according to claim 22, further comprising calculating a second key using a pseudo-random algorithm to combine the first key with the non-ciphered data.

24. A method for deciphering an audio or video ciphered data stream that includes a plurality of data packets each having input data bits to be deciphered and each delimited by two consecutive synchronization markers, the method comprising:

for each data packet, producing a new pseudo-random cipher stream at each initial synchronization marker of the data packet, each pseudo-random cipher stream being different for each data packet;

for each data packet, applying the cipher stream for the data packet bit by bit, with the input data bits for the data packet, using an "exclusive OR" function, to obtain deciphered data bits; and replacing in the data stream the input data bits with the ciphered data bits at positions the input data bits respectively occupied before deciphering, wherein each cipher stream is generated by processing non-ciphered data of the data stream and the data packets to which the method is applied are partly coded by tables of reversible codewords of variable length and of non-reversible codewords of variable length, which are signed or unsigned, and wherein the input data bits to be ciphered are all bits of the data packets that result in codewords of the codeword table, after being subjected to the producing and applying steps.

25. A method for deciphering an audio or video ciphered data stream that includes a plurality of data packets each having input data bits to be deciphered and each delimited by two consecutive synchronization markers, the method comprising:

for each data packet, producing a new pseudo-random cipher stream at each initial synchronization marker of the data packet, each pseudo-random cipher stream being different for each data packet;

for each data packet, applying the cipher stream for the data packet bit by bit, with the input data bits for the data packet, using an "exclusive OR" function, to obtain deciphered data bits; and replacing in the data stream the input data bits with the ciphered data bits at positions the input data bits respectively occupied before deciphering, wherein each cipher stream is generated by processing non-ciphered data of the data stream and the data packets to which the method is applied are partly coded by tables of reversible codewords of variable length and of non-reversible codewords of variable length, which are signed or unsigned, the method further comprising adding to the table of codewords an index for identifying each codeword of the table, as well as at least one parameter which defines, for each codeword of the table, a number and a position, in the codeword, of each bit to be ciphered.

* * * * *